United States Patent [19]

Mirzadeh et al.

[11] 4,248,730

[45] Feb. 3, 1981

[54] EVAPORATION-BASED GE/$^{68}$GA SEPARATION

[75] Inventors: Saed Mirzadeh, Albuquerque; Richard E. Whipple, Los Alamos; Patrick M. Grant, Los Alamos; Harold A. O'Brien, Jr., Los Alamos, all of N. Mex.

[73] Assignee: The United States of America as represented by the United States Department of Energy, Washington, D.C.

[21] Appl. No.: 74,855

[22] Filed: Sep. 13, 1979

[51] Int. Cl.[3] .......................... C09K 3/00; C09K 11/04

[52] U.S. Cl. .................................. 252/301.1 R; 423/2; 423/423; 423/429; 424/1

[58] Field of Search ................ 252/301.1 R, 301.1 W; 424/1; 422/903; 250/430, 435; 203/5, 42; 423/131, 132, 133, 301.1 R, 21, 89, 96, 98, 423; 55/17

[56] References Cited

PUBLICATIONS

Chem. Abs., vol. 81, 1974, Art. No. 180245n.

K. V. Malyshev et al., Soviet Radio Chemistry, vol. 12, pp. 137–139, 1975.

71-Nuclear Technology, vol. 86, 1977, Art. No. 86:129603d.

G. J. Ehrhardt et al., Jrnl. of Nuclear Medicine, vol. 19, pp. 925–929,09 Feb. 9, 1979.

*Primary Examiner*—Frank Sever

*Attorney, Agent, or Firm*—James E. Denny; Paul D. Gaetjens; Edward C. Walterscheid

[57] ABSTRACT

Micro concentrations of $^{68}$Ga in secular equilibrium with $^{68}$Ge in strong aqueous HCl solution may readily be separated in ionic form from the $^{68}$Ge for biomedical use by evaporating the solution to dryness and then leaching the $^{68}$Ga from the container walls with dilute aqueous solutions of HCl or NaCl. The chloro-germanide produced during the evaporation may be quantitatively recovered to be used again as a source of $^{68}$Ga. If the solution is distilled to remove any oxidizing agents which may be present as impurities, the separation factor may easily exceed $10^5$. The separation is easily completed and the $^{68}$Ga made available in ionic form in 30 minutes or less.

8 Claims, 2 Drawing Figures

EVAPORATION-BASED GE/$^{68}$GA SEPARATION

BACKGROUND OF THE INVENTION

The invention described herein relates to a method for producing carrier-free $^{68}$Ga in ionic form and more particularly to a method for the rapid separation of $^{68}$Ga from $^{68}$Ge based on the volatilization of chloro-germanium compounds from strong aqueous HCl. It is a result of contract W-7405-Eng-36 with the Department of Energy.

The short-lived radioisotope $^{68}$Ga (half-life of 68 minutes) is useful in a variety of biomedical applications, e.g., in bone imaging and soft-tissue tumor imaging.

Gallium-68 is obtained as a daughter of 288-day $^{68}$Ge. It is known that the separation of $^{68}$Ge and $^{68}$Ga can be accomplished by extraction and adsorption techniques. Thus, for example, $^{68}$Ga (not carrier free) may be extracted with acetyl acetone from acidic solution and then back extracted into 0.1 M HCl. Alternatively, $^{68}$Ge (not carrier free) may be extracted from HCl solution (~9 M) by carbon tetrachloride, with the $^{68}$Ga remaining almost entirely in the HCl solution. A commercially available $^{68}$Ga generator makes use of carrier-free $^{68}$Ge which is strongly adsorbed on aluminum oxide. The $^{68}$Ga is eluted with a neutral solution of 0.005 M EDTA. The $^{68}$Ga is obtained in the form of a Ga-EDTA complex.

For many medical applications, it is necessary to prepare the gallium in the ionic form. To accomplish this, the $^{68}$Ga-EDTA chelate is usually destroyed by digestion with concentrated HCl after the addition of gallium carrier. The $^{68}$Ga is separated in ionic form by ion exchange or extraction. Because of the rapid decay of the $^{68}$Ga, only a 30% yield or less can normally be expected. Moreover, heretofore at least, Ga/Ge separation factors in the range of about $10^4$ to $10^5$ have been achieved. It would be quite advantageous to achieve higher separation factors.

Accordingly, it is an object of this invention to provide a procedure for separating ionic $^{68}$Ga from $^{68}$Ge.

Another object is to provide a rapid method for separating carrier-free $^{68}$Ga from carrier-free $^{68}$Ge.

Yet another object is to provide a method for separating $^{68}$Ga from $^{68}$Ge wherein the separation factor exceeds $10^5$.

Other objects, advantages, and novel features of the invention will become apparent to those skilled in the art upon examination of the following detailed description of a preferred embodiment of the invention and the accompanying drawings.

SUMMARY OF THE INVENTION

In its broad scope the present invention encompasses a method for separating $^{68}$Ga in ionic form from $^{68}$Ge which comprises first forming a strong aqueous HCl solution of $^{68}$Ge and $^{68}$Ga, in secular equilibrium, with the activity being in the range of $10^{-5}$ to about 5 mCi. The solution is then evaporated to dryness and the $^{68}$Ga leached from the solution container after the evaporation is completed.

Preferably, both the $^{68}$Ge and the $^{68}$Ga are carrier free, and the solution is about 6 M in HCl and is purified of oxidizing agents before evaporation occurs. The $^{68}$Ge is evaporated as chloro-germanide, which is quantitatively recovered.

In accordance with the preferred embodiment, essentially all of the $^{68}$Ga is recovered from the solution and the separation factor of the $^{68}$Ga from the $^{68}$Ge exceeds $10^5$. By appropriate control of the initial volume and the mode of evaporating to dryness, the $^{68}$Ga can readily be made available in ionic form in less than 30 minutes.

DESCRIPTION OF THE INVENTION

Figure 1:
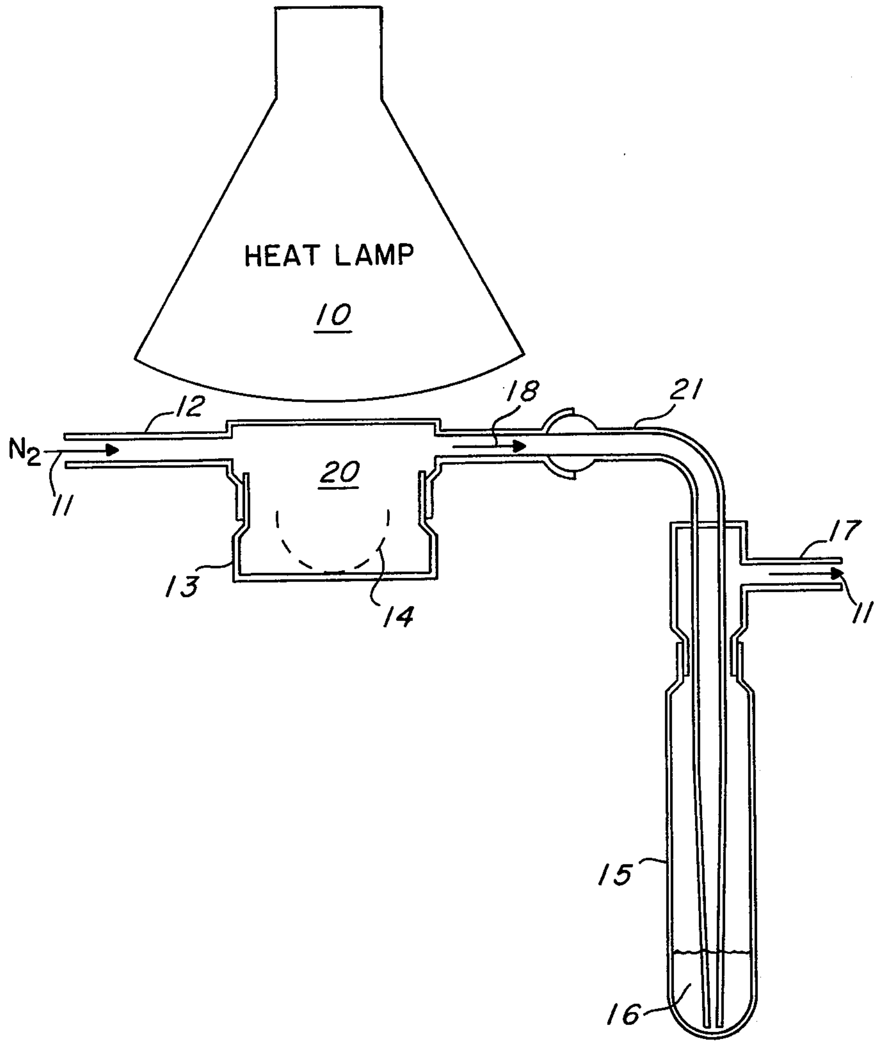
FIG. 1 is a schematic representation of the apparatus used to obtain the data of the runs set forth in the Table.

At a concentration of 71 mg per kilogram of body weight, gallium begins to exhibit toxicity in the human body. It is thus highly desirable that ingestion of gallium for biomedical purposes be kept well below this level. In addition, the less the quantity of $^{68}$Ge used for purposes of $^{68}$Ga generation, the less the amount of shielding which is required to protect from radiation. Moreover, $^{68}$Ge is expensive, so that simple economics dictates the use of small quantities. Finally, most biomedical applications can be readily performed using exceedingly small quantities of $^{68}$Ga. These considerations suggest that it is quite advantageous to have a separation technique in which both the $^{68}$Ge and the $^{68}$Ga are carrier free.

By carrier free is meant that the radioactive isotopes have had no stable isotopes intentionally added to serve as carriers. That is to say, there are no stable isotopes of germanium or gallium present in quantities detectable by ordinary chemical or spectrographic means.

Because there is preferably no carrier present, the separation of $^{68}$Ga from $^{68}$Ge for biomedical purposes typically involves only trace quantities ($<10^{-9}$ g) of gallium. At these low concentrations, it is well known that the behaviour of substances may differ from that of ordinary or macro concentrations. While it is frequently possible to predict that there is likely to be a difference, just what that difference will in fact be can normally only be determined by experiment. As a consequence, it is not possible to accurately ascertain whether a separation which might readily be made at macro concentrations can also be made to occur at micro or tracer concentrations.

In particular, it is not possible to predict what the variation in the separation factor will be when the concentrations are so drastically lowered. By separation factor is meant the ratio of the fraction of $^{68}$Ga recovered to the fraction of the $^{68}$Ge found in the product. Thus, although a standard procedure for the separation of macro amounts of germanium from other elements involves the distillation of germanium (IV) from hydrochloric acid solutions, there is nothing in the literature which in any way indicates whether or to what extent this technique could be used to implement an effective separation of $^{68}$Ge and $^{68}$Ga at the concentrations of interest.

The present invention is predicated on the fact that $^{68}$Ge may be readily removed by volatilization from a strong HCl solution. In a preferred embodiment, an azeotropic solution of HCl containing mCi quantities (ranging from 0.3 to 2.2 mCi) of carrier-free $^{68}$Ge, in secular equilibrium with $^{68}$Ga, was evaporated to dryness under a heat lamp in a stream of nitrogen. The radiogallium was obtained by leaching the evaporation dish with 0.1 M HCl, while the $^{68}$Ge was quantitatively recovered in a downstream cold trap. The procedure is rapid and relatively simple, and, over nine replicate analyses, gave essentially quantitative $^{68}$Ga yields while exhibiting a Ga/Ge separation factor of $(2.0 \pm 1.2) \times 10^6$. To obtain this separation factor, it was beneficial to initially purify the commercially obtained $^{68}$Ge by distillation.

The apparatus used in the various runs is shown schematically in FIG. 1. For each run, the mixture of $^{68}$Ga and $^{68}$Ge in acidic solution was placed in Pyrex evaporation dish 13 or in a quartz or Teflon evaporation dish 14 placed within dish 13. Nitrogen gas stream 11 at room temperature was introduced into evaporation region 20 through tube 12 at a desired rate. The solution in dish 13 or 14 was then evaporated to dryness by heat lamp 10 and the mixture 18 of nitrogen gas and volatile chloro-germanide passed through tube 21 into cold trap 15, where the $^{68}$Ge was collected. With the exception of dish 14, all components of the apparatus were made of Pyrex.

The following evaporation procedure was typical. A sample consisting of 0.5 ml of purified carrier-free $^{68}$Ge solution, 0.24 M in HCl, and 1 ml of 6 M HCl was transferred to evaporation dish 13 or 14. Nitrogen gas stream 11 and 250 W infrared heat lamp 10 were turned on. The nitrogen flow was about 10 ml/min. The spacing of heat lamp 10 from the surface of the solution was ~3.5 cm. After the solution was evaporated to apparent dryness the sample was heated for an additional five minutes. The $^{68}$Ga was recovered from evaporation dish 13 or 14 by rinsing with 3 one-ml portions of 0.1 M HCl.

Evaporation of 1.5 ml of the solution (0.5 ml of 0.24 M HCl and 1 ml of 6 M HCl) using the apparatus of FIG. 1 required about 10–15 minutes with a Pyrex or quartz evaporation dish and about 15–20 minutes with a Teflon crucible. Leaching $^{68}$Ga from the evaporation dish and preparation of the sample for counting required an additional 10 minutes. Therefore, in general, the total time required to complete the separation process ranged from 20 to 30 minutes.

Figure 2:
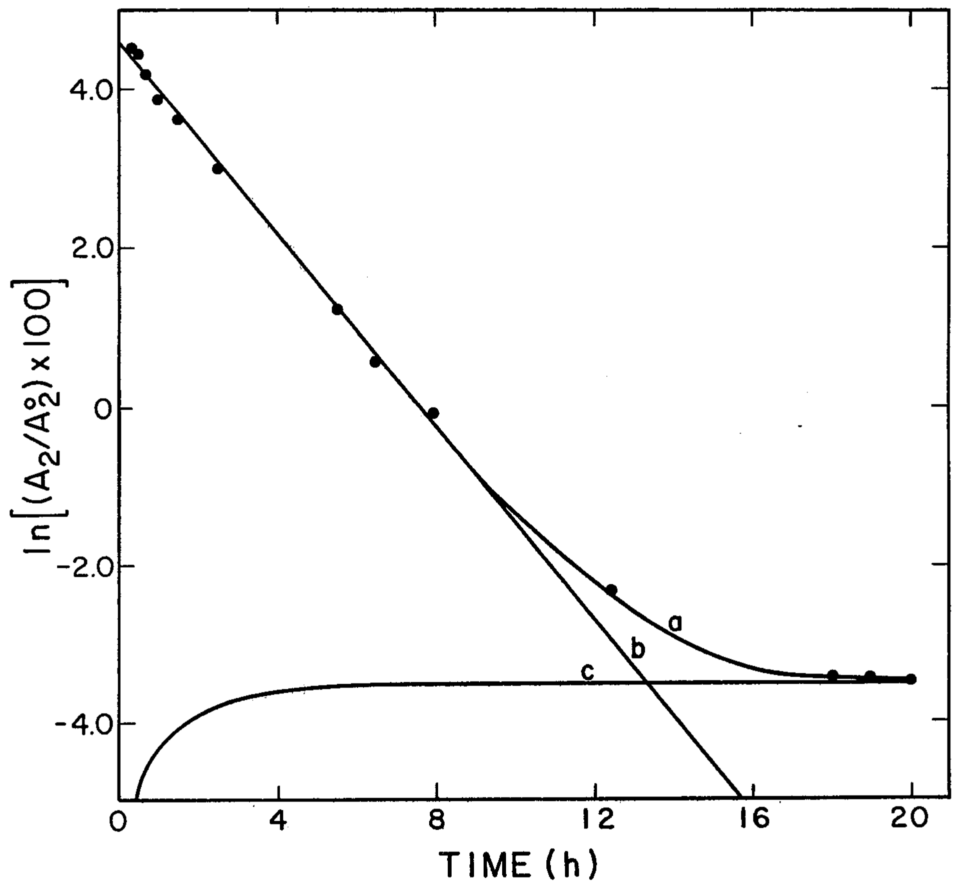
FIG. 2 shows the decay curves of a mixture of $^{68}$Ga and $^{68}$Ge.

The liquid samples were counted in a NaI(Tl) well-type scintillation crystal coupled to a single-channel analyzer (Hewlett-Packard 5201L Scaler-Timer). The lower discriminator was set to eliminate gamma radiation less than about 0.4 MeV. Thus, only radiation from the $^{68}$Ga was detected. A typical decay curve of a nearly pure sample of $^{68}$Ga separated from $^{68}$Ge in equilibrium with $^{68}$Ga is shown in FIG. 2.

Because the $^{68}$Ge continues to serve as a source of $^{68}$Ga, it is essential that the $^{68}$Ge be quantitatively recovered in the separation process. In the apparatus of FIG. 1, the mixture 18 of nitrogen and volatile chlorogermanide passes through tube 21 into cold trap 15, where it bubbles through 5 ml of water 16. The chlorogermanides condense and collect in cold trap 15 while the nitrogen 11 exits through tube 17. In all of the runs quantitative recovery of the $^{68}$Ge was achieved. In one experiment, the $^{68}$Ge from eight consecutive samples, each consisting of 0.5 ml of 0.24 M HCl and 1 ml of 6 M HCl, was collected in a cold trap which initially contained 5 ml of water. The final solution, which had a volume of 17 ml and was about 2.8 M in HCl, was transferred to a 100-ml distillation flask. Thirty-three ml of 8 M HCl was added to adjust the total volume and HCl concentration to 50 ml and 6.2 M, respectively. On distillation, the first 5-ml portion of the distillate contained about 95% of the total $^{68}$Ge; approximately 100% of the $^{68}$Ge was recovered in the first 10-ml portion of the distillate.

The results of a number of experiments are summarized in the Table. In these runs, a solution of carrier-free $^{68}$Ge obtained from New England Nuclear Inc. (NEN) was purified and used.

TABLE

| Evaporation of $^{68}$Ge, in Secular Equilibrium with $^{68}$Ga, from 6 M Hydrochloric Acid | | | |
|---|---|---|---|
| Activity (mCi) | $^{68}$Ga Yield (%) | $^{68}$Ge Retained (%) | Separation Factor |
| 0.31 | 98 | $2.4 \times 10^{-4}$ | $4.0 \times 10^5$ |
| 0.29 | 98 | $2.2 \times 10^{-5}$ | $4.5 \times 10^6$ |
| 2.2 | 100 | $4.3 \times 10^{-4}$ | $2.3 \times 10^5$ |
| 2.2 | 99 | $3.8 \times 10^{-5}$ | $2.6 \times 10^6$ |
| 0.69 | — | — | $2.0 \times 10^6$ |
| 0.73 | — | — | $2.0 \times 10^6$ |
| 0.48 | — | — | $2.0 \times 10^6$ |
| 0.45 | — | — | $2.1 \times 10^6$ |
| 0.48 | — | — | $1.9 \times 10^6$ |
| | | | Mean = $(2.0 \pm 1.2) \times 10^6$ |

As obtained, 1 ml of this solution was 0.5 M in HCl and contained approximately 1.6 mCi of activity. An activity level of 20,000 counts per minute on the NaI(T1) system was approximately equivalent to a $^{68}$Ge content of $10^{-5}$ mCi or $1 \times 10^{-12}$ grams based on activity data supplied by NEN. In each instance, the reported gallium yield was corrected for decay. The percent germanium retained was calculated from activity present in the sample after 36 hours.

A Pyrex evaporation dish treated with chromic acid cleaning solution was used. The gallium was removed from the surface of the evaporation dish with 3 one-ml portions of 0.1 M HCl. The evaporation process took about 20–25 minutes using the apparatus of FIG. 1, depending on the volume of the solution.

From the Table it can be seen that in all instances evaporation of $^{68}$Ge which had been in secular equilibrium with $^{68}$Ga in HCl solution results in essentially quantitative retention of the $^{68}$Ga on the evaporation dish. The average Ga/Ge separation factor for these nine experiments was measured to be $(2.0 \pm 1.2) \times 10^6$, a factor of 10–100 greater than that obtained with present generators.

The efficiency of leaching of $^{68}$Ga from three types of evaporation dish using four different leaching reagents was studied. The gallium samples were obtained using the same procedure as that used in the runs of the Table. The evaporation dishes were treated with chromic acid prior to each run. In each run the gallium was removed from the evaporation dish with 3 one-ml portions of the leaching agent.

The removal of $^{68}$Ga from Pyrex, Quartz, and Teflon evaporation dishes with 0.1 M HCl was quantitative $(99 \pm 2\%)$ and appeared to be independent of the pretreatment of the evaporation dishes. Quantitative removal of $^{68}$Ga from a Pyrex dish could also be readily accomplished with 0.1 M NaCl.

The foregoing description of a preferred embodiment of the invention has been presented for purposes of illustration and description and is not intended to be exhaustive or to limit the invention to the precise form disclosed. It was chosen and described in order to best explain the principles of the invention and their practical application to thereby enable others skilled in the art to best utilize the invention in various embodiments and with various modification as are suited to the particular use contemplated. It is intended that the scope of the invention be defined by the claims appended hereto.

What we claim is:

1. A method for separating $^{68}$Ga in ionic form from $^{68}$Ge which comprises (a) forming a strong aqueous, about 6 M HCl solution of $^{68}$Ge and $^{68}$Ga in secular equilibrium the activity of said solution being in the range of $10^{-5}$ to about 5 mCi, in a container (b) evaporating said solution to dryness, and (c) leaching said $^{68}$Ga from the container wall after said evaporation is completed.

2. The method of claim 1 wherein said solution is azeotropic in HCl.

3. The method of claim 2 wherein the $^{68}$Ge evaporated from said solution is quantitatively recovered.

4. The method of claim 3 wherein the volume of said solution does not exceed 1.5 ml.

5. The method of claim 2 wherein said $^{68}$Ga is leached from the container wall by a leaching agent consisting of HCl in aqueous solution or NaCl in aqueous solution.

6. The method of claim 5 wherein said leaching agent is 0.1 M HCl.

7. The method of claims, 1, 2, 3, 4, 5, or 6 wherein said $^{68}$Ge and said $^{68}$Ga in said solution are carrier free.

8. The method of claim 7 wherein said solution is purified of oxidizing agents before said evaporation occurs.

* * * * *

UNITED STATES PATENT OFFICE

CERTIFICATE OF CORRECTION

Patent No. 4,248,730 Dated February 3, 1981

Inventor(s) Saed Mirzadeh, Richard E. Whipple, Patrick M. Grant, Harold A. O'Brien, Jr.

It is certified that error appears in the above-identified patent and that said Letters Patent are hereby corrected as shown below:

On the cover page, the title should read:

-- "Evaporation-Based $^{68}$GE/$^{68}$GA Separation" --.

Signed and Sealed this

*Twenty-eighth* Day of *July 1981*

[SEAL]

*Attest:*

GERALD J. MOSSINGHOFF

*Attesting Officer* *Commissioner of Patents and Trademarks*